United States Patent
Kwiat et al.

(10) Patent No.: US 10,652,013 B2
(45) Date of Patent: *May 12, 2020

(54) RECONFIGURABLE FREE-SPACE QUANTUM COMMUNICATION SYSTEM

(71) Applicants: The Board of Trustees of the University of Illinois, Urbana, IL (US); Duke University, Durham, NC (US)

(72) Inventors: Paul G. Kwiat, Savoy, IL (US); Daniel J. Gauthier, Columbus, OH (US)

(73) Assignees: The Board of Trustees of the University of Illinois, Urbana, IL (US); Duke University, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/416,455

(22) Filed: May 20, 2019

(65) Prior Publication Data

US 2019/0280859 A1    Sep. 12, 2019

Related U.S. Application Data

(63) Continuation of application No. 15/434,313, filed on Feb. 16, 2017, now Pat. No. 10,333,701.

(60) Provisional application No. 62/301,072, filed on Feb. 29, 2016.

(51) Int. Cl.
*H04L 29/06* (2006.01)
*H04L 9/08* (2006.01)
*H04B 10/70* (2013.01)

(52) U.S. Cl.
CPC ........... *H04L 9/0822* (2013.01); *H04B 10/70* (2013.01); *H04L 9/0852* (2013.01); *H04L 9/0869* (2013.01)

(58) Field of Classification Search
CPC ..... H04B 10/70; H04L 9/0822; H04L 9/0852; H04L 9/0869; B64C 33/025; B64C 39/001; B64C 39/08; B64C 2201/00
See application file for complete search history.

(56) References Cited

U.S. PATENT DOCUMENTS

| | | |
|---|---|---|
| 5,966,224 A | 10/1999 | Hughes et al. |
| 6,748,083 B2 | 6/2004 | Hughes et al. |
| 9,787,409 B1 | 10/2017 | Ladd |

(Continued)

OTHER PUBLICATIONS

Bacco et al., "Experimental quantum key distribution with finite-key security analysis for noisy channels," *Nature Comm.*, vol. 4, 8 pages (2013).

(Continued)

*Primary Examiner* — Amir Mehrmanesh
(74) *Attorney, Agent, or Firm* — Sunstein LLP

(57) ABSTRACT

A system, and methods, for transmitting quantum states between a first node and a second node, or among more than two nodes. Each node is characterized by an instantaneous spatial position, and the instantaneous spatial position of the second node is repositionable within a frame of reference associated with the first node. A hovering drone is adapted either for running a quantum key transmission protocol in secure communication with the first node, and/or for running a quantum key reception protocol in secure communication with the second node. Either drone may serve as a relay of optical data between a base station and another drone. Secure communication among more than two nodes may be reconfigured.

21 Claims, 3 Drawing Sheets

(56) References Cited

U.S. PATENT DOCUMENTS

| | | | |
|---|---|---|---|
| 10,209,188 B2* | 2/2019 | Ng | G08G 5/0013 |
| 2015/0134947 A1 | 5/2015 | Varcoe et al. | |
| 2017/0069214 A1 | 3/2017 | Dupray et al. | |
| 2017/0173262 A1 | 6/2017 | Veltz | |
| 2017/0253330 A1 | 9/2017 | Saigh et al. | |
| 2018/0043386 A1* | 2/2018 | Busby | B05B 13/005 |
| 2018/0276994 A1 | 9/2018 | Dukatz et al. | |
| 2019/0019141 A1 | 1/2019 | Torii et al. | |
| 2019/0023392 A1 | 1/2019 | Micros | |

OTHER PUBLICATIONS

Bennett et al., "Quantum Cryptography: Public Key Distribution and Coin Tossing," *Proceedings of the IEEE International Conference on Computers, Systems & Signal Processing (Bangalore)*, pp. 175-179 (Dec. 1984).

Bourgoin et al., "Free-space quantum key distribution to a moving receiver," *Opt. Exp*, vol. 23 (26), pp. 33437-33447 (2015).

Buttler et al., "Daylight quantum key distribution over 1.6 km," *Phys. Rev. Lett.*, vol. 84, 4 pages (2000).

Hwang W., "Quantum Key Distribution with High Loss: Toward Global Secure Communication," *Phys. Rev. Lett.*, vol. 91 (5), pp. 057901-1-057901-4 (Aug. 2003).

Lo et al., "Secure Quantum Key Distribution," *Nature Photonics*, vol. 8, pp. 595-604 (2014).

Nauerth et al., "Air-to-ground quantum communication," *Nature Photonics*, vol. 7, pp. 382-386 (May 2013).

Qi et al., "Free-space reconfigurable quantum key distribution network," *Proceedings of the IEEE International Conference on Space Optical Systems and Applications (ICSOS)*, pp. 1-6 (Oct. 2015).

Shor et al., "Simple Proof of Security of the BB84 Quantum Key Distribution Protocol," *Phys. Rev. Lett.*, vol. 85 (2), pp. 441-444 (Jul. 2000).

Song et al., "A Summary of Key Technologies of Ad hoc Networks with UAV Node," *Proceedings of the IEEE Conf. on Intelligent Computing and Integrated Systems (ICISS)*, pp. 944-949 (2010).

Ursin et al., "Entanglement-based quantum communication over 144km," *Nature Phys.*, vol. 3, pp. 481-486 (2007).

Vallone et al., "Experimental Satellite Quantum Communications," *Phys. Rev. Lett.*, vol. 115, 7 pages (2015).

Wang X., "Beating the PNS attack in practical quantum cryptography," *Phys. Rev.*, vol. 94, 12 pages (2005).

Zhang et al., "Detection and compensation of basis deviation in satellite-to-ground quantum communications," *Opt. Exp.*, vol. 22 (8), pp. 9871-9886 (2014).

Zhang et al., "Reference-Frame-Independent Quantum-Key-Distribution Server with a Telecom Tether for an On-Chip Client," *Phys. Rev. Lett.* vol. 112, pp. 130501-1-130501-5 (2014).

* cited by examiner

US 10,652,013 B2

RECONFIGURABLE FREE-SPACE QUANTUM COMMUNICATION SYSTEM

The present application is a continuation application of U.S. application Ser. No. 15/434,313, filed Feb. 16, 2017, which issued as U.S. Pat. No. 10,333,701, and which claims priority from U.S. Provisional Patent Application 62/301,072, filed Feb. 29, 2016. All of the foregoing applications are hereby incorporated herein by reference in their entirety.

This invention was made with government support under N00014-13-1-0627 awarded by Office of Naval Research. The Government has certain rights in the invention.

TECHNICAL FIELD

The present invention relates to systems and methods for maintaining secure communications between two parties, and, more particularly, for maintaining secure communications between two parties via at least one drone hovering with respect to one of the parties, where 'hovering' is defined below.

BACKGROUND ART

Preliminary Definitions: As used in this description and the accompanying claims, the following terms shall have the meanings indicated, unless the context otherwise requires:

The adjective "reconfigurable" as applied to a communication network shall mean that the communication network has more than two nodes, and that connections among the nodes can be "changed." "Changing a connection" among nodes of a network of at least three nodes is defined to mean permuting the order of nodes through which a communication traverses nodes of the network. Thus, the institution of a new communication link as part of a network constitutes an example of "changing a connection." Merely changing a communication protocol, where there has been no change in order of nodes, does not constitute "reconfiguration," as the term is defined herein.

The term "repositionable" shall refer to the fact that the relative position in of the communication nodes can be moved in coordinate space, e.g., to a different location in a city, or a different location on a battlefield.

"Free-space" shall refer to propagation of an electromagnetic wave that is unguided is the sense that no structure imposes boundary conditions on the field comprising the wave.

"Free-space distribution" of information, or of a quantum signal, as the case may be, shall refer to transfer of that information, or, mutatis mutandis, of that quantum signal, via an electromagnetic wave subject to free-space propagation over at least a portion of the path over which the information or quantum signal is distributed. (See below for the definition of "quantum signal.")

The term "hover" shall mean to maintain a substantially fixed vertical relationship with respect to a specified locus on the surface of the Earth. It is to be understood that the specified locus may be in motion, in which case a hovering object will track the motion of the specified locus.

The term "vertically hovering" is synonymous with "hovering."

Wireless transmission of many types of sensitive data to be transmitted wirelessly creates a problem of security with respect to access to that information. This is particularly important when the transmitted data includes HIPAA-protected medical data, bank data, military drone technology and military data. As an example of compromised security, Predator military drones have reportedly been hacked. The creation of unbreakable encryption technology is thus vital to protect sensitive data.

Quantum cryptography has been determined to be an unbreakable encryption technology, when properly implemented. Quantum cryptography has thus far seen a number of demonstrations, either using a fiber optic channel (as might potentially be networked, although most of the demonstrations have been single dedicated fiber links), or using a free-space optical channel. The latter has been demonstrated in laboratories, across cities, and between two of the Canary Islands (at a distance of 144 km), as described by Ursin et al., *"Entanglement-based quantum communication over 144 km,"* Nature Phys., vol. 3, pp. 481-486 (2007), which is incorporated herein by reference.

The drawback of each of these is that the sending and receiving nodes are fixed, and generally not particularly portable. The participle "fixed," as used herein to describe a node of a network relative to another node, relates to the relative geometrical position of one node with respect to the other node, in three-dimensional position space. For example, in the demonstrations using telescopes, these are rather large, and must be very carefully aligned with each other in order to permit the optical link. For the fiber optic links, one must usually have a dedicated fiber optic line (in any event, there needs to be a direct optical path from sender to receiver). This is fine if there are already optical fibers in place, but in many cases that would not be the situation.

A general review of secure quantum key distribution may be found in Lo et al., *"Secure quantum key distribution,"* Nature Photonics, vol. 8, pp. 595-604 (2014), which is incorporated herein by reference. All free-space distribution of quantum keys that has ever been suggested has been between two nodes that share a line of sight. Examples include:

fixed telescopes at each of two nodes, as discussed, for example, by Buttler et al., *"Daylight quantum key distribution over 1.6 km,"* Phys. Rev. Lett., vol. 84, 5652 (2000), incorporated herein by reference, and subsequently by others.

a fixed telescope to a moving truck: Bourgoin et al., *"Free-space quantum key distribution to a moving receiver,"* Opt. Exp., vol. 23, pp. 33437-47 (2015); and plane to ground: Nauerth et al., *"Air-to-ground quantum communication,"* Nature Photonics, vol. 7, pp. 382-386 (2013).

All of the foregoing references are incorporated herein by reference.

All free-space QKD systems that have been either implemented or proposed have entailed a line of sight between at least two nodes of a network that, for at least some period of time, is either direct or fixed or both. For example, U.S. Pat. No. 5,966,224 (to Hughes et al.) contemplates two fixed earth stations in optical communication with a commonly accessed satellite.

While the paper, Qi et al., *"Free-space reconfigurable quantum key distribution network,"* 2015 IEEE International Conference on Space Optical Systems and Applications (ICSOS), pp. 1-6, (Oct. 16, 2015) (hereinafter "Qi (2015), incorporated herein by reference) suggests the application of quantum key distribution (QKD) in a mobile network using an untrusted network relay; however, in that paper the term "reconfigurable" refers to the capacity to readily switch between a highly secure measurement-device-independent (MDI) QKD system and a highly efficient decoy state, the Bennett and Brassard quantum cryptography protocol BB84. Qi (2015) does not, however, contemplate how secure communications might be established, in practice, between two parties, of which the first is free to move with respect to the second.

All secure communications links in the prior art have required that either a free-space link or a fiber link exist either between two nodes or between both of the nodes and a common relay. Methods for overcoming that limitation would be of great value.

Certain embodiments of the invention described below are directed toward solving the problem of creating an unbreakable encryption technology where the spatial relationship between two or more parties is reconfigurable. Properly implemented, it may enable quantum cryptographic links to be readily established, e.g., on the battlefield, between branches of a bank, between two drones, or even between residential users and a central communication hub.

SUMMARY OF EMBODIMENTS OF THE INVENTION

In accordance with embodiments of the invention, methods and apparatus are provided for transmitting encrypted information as a quantum transmission between a first node and a second node. Each node is characterized by an instantaneous spatial position, the instantaneous spatial position of the second node being repositionable within a frame of reference associated with the first node. Any of the nodes may be fixed or repositionable with respect to any arbitrarily defined frame of reference in coordinate space. The system has a hovering drone adapted to run a quantum key transmission protocol, based on secure communication with the first node, either during the course of hovering or prior to elevation above the first node.

In accordance with other embodiments of the invention, the first drone may be adapted to receive a secure communication from the first node while in hovering relationship with the first node, or, otherwise, prior to elevation of the drone. The system may also have a second drone adapted to run a quantum key reception protocol, based on secure communication with the second node. Again, the secure communication between the second node and the second drone may occur during the course of hovering relationship with the second drone, or otherwise prior to hovering or after hovering. The system may additionally have a locking beacon for maintaining the first and second drone in a relative position for quantum key transmission and reception.

In accordance with various other embodiments of the present invention, the first drone may include a preprogramed source for quantum key distribution and the second drone may include a preprogrammed measurement system for quantum key distribution. The first drone may include a random number generator, and, alternatively or additionally, the second drone may include a random number generator.

In accordance with further embodiments of the invention, the system may also have a secure link for transmitting light from a secure source at the first node to the first drone. A random number generator may be disposed at the first node.

In accordance with yet further embodiments of the present invention, the first and second drones may be adapted to initiate an acquisition protocol to establish quantum key transmission from the first to the second drone. The acquisition protocol may employ a finding mechanism chosen from a set of modalities including GPS, inertial guidance, and optical beacons operating at a different wavelength and/or a different temporal mode or a different spatial mode from a wavelength, temporal mode and spatial mode characterizing the quantum transmission.

In accordance with another aspect of the present invention, a method is provided for transmitting encrypted information as a quantum signal between a first node and a second node, where the second node is repositionable within a frame of reference associated with the first node. The method entails transmitting data from the first node to the second node via at least the first drone in accordance with a quantum encryption protocol.

In accordance with other embodiments of the present invention, the method may also have a step of transmitting random bits securely from the first node to the first drone, and the random bits may be transmitted securely from the first node to the first drone via an optical fiber tether or via free-space optics. The random bits may also be generated within the first drone.

In accordance with a further embodiment of the invention, the first drone may be an optical relay of the quantum signal from the first node to a second drone.

In accordance with yet further embodiments of the invention, there may also be a step of sending the first drone aloft in communication with the first node. Additionally, there may be steps of:

a. sending a second drone aloft;
b. initiating an acquisition protocol to establish quantum key transmission from the first to the second drone;
c. locking a relative orientation of the first and second drones to maintain alignment of a beam between the first and second drones; and
d. transmitting data from the first node to the second node via the first drone in accordance with a quantum encryption protocol.

In accordance with other embodiments of the invention, the second drone may act as an optical relay of the quantum signal from the first drone to the second node. There may also be other optical relays of the quantum signal. A QKD measurement may be performed aboard the second drone of the quantum signal received by the second drone. There may be additional steps of securely transmitting data from the first drone to the second drone, and of securely transmitting data among a plurality of drones.

BRIEF DESCRIPTION OF THE DRAWINGS

The foregoing features of the invention will be more readily understood by reference to the following detailed description, taken with reference to the accompanying drawings, in which:

The features, objects and advantages other than those set forth above will become more readily apparent when consideration is given to the detailed description below. Such detailed description makes reference to the following drawings, wherein:

In FIG. 1A, a sender base loads random string (indicating the quantum state of each photon to be sent) onto the sender drone; the receiver base loads random string (indicating the basis measurement choice for each photon) onto the receiver drone. Alternatively, the measurement basis choice could be made at random on the receiver drone. FIG. 1B depicts transmission of cryptographic data from one elevated drone to another; and FIG. 1C depicts return of drones to their bases.

DETAILED DESCRIPTION OF EMBODIMENTS OF THE INVENTION

Figure 1A:
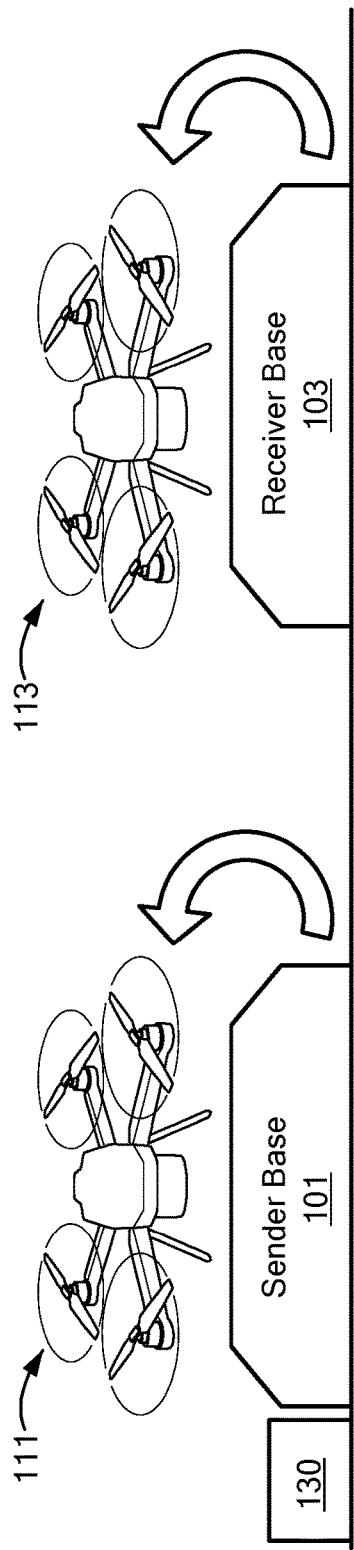
FIGS. 1A-1C depict steps of a drone-based quantum key distribution protocol in accordance with an embodiment of the present invention.

In accordance with embodiments of the present invention, the aforementioned problems surrounding communications technologies which have thus far been suggested may be advantageously overcome by the use of portable drones. Under conditions in which optical acquisition can be achieved, drones may be deployed extremely rapidly, advantageously, particularly in a battlefield situation, or between different branches of a bank in a city, between two elevated drones, or even between home users and some central base. In all of these, there is no easy way to imagine the existing fixed telescopes solutions or fiber solutions working (e.g., the fibers that go into houses certainly have other switches and amplifiers in place, which would make the system prohibitively expensive, or prohibitively lossy so as to prevent the distribution of secure key material using them). The portable characteristic of the drones allows the communication nodes to be repositioned. The term "portable," as used herein, means Another advantage to the use of drones in secure communications is presented by the ability of drones to operate at various altitudes. This may advantageously enable a secure link to be developed over the level of fog, which might otherwise make such a link impossible, as in the case of a communication between one ship and another. As used in this document, the word "ship" shall refer to any vessel adapted for transportation on water.

Further Definitions: The following terms shall have the meanings indicated, unless otherwise dictated by context:

The term "drone," as used herein and in any appended claims, shall mean any unmanned aircraft, in the most general sense, whether capable of flying autonomously or under remote human control. The term is used in its most general sense and without further limitation. Thus, all unmanned aerial vehicles (UAVs) and remotely piloted aircraft (RPAs) fall within the definition of "drone" as the term is used herein. The term "aerial drone" is synonymous with the term "drone," for purposes of the present document.

The term "node," as applied to a network, has a specially defined meaning as used herein and in any appended claims: a "node" is a communication endpoint with respect to which "trust" has a meaning. Thus, a drone (as defined) may be hovering (as defined) above a first node (as defined) of a network and may serve as an extension of the first node, in that the drone is not a separate communication endpoint and it need not be "trusted," because, for example, it merely serves as an optical relay.

The definition of "trust," as used here in a rigorous cryptographic sense, means that the laws of physics preclude undetected interception or modification of information traversing a specified path in space-time through action of a party distinct from the set of parties who cause that information to traverse the specified path.

The term "quantum signal" refers to an element (technically, a vector) of a Hilbert space $\mathcal{H}$ from which information about a specified quantum system is extracted by subjecting the quantum system to a quantum measurement.

The term "instantaneous spatial position" is the location of a specified object in coordinate space at one instant of time. Nodes of a network that are characterized by an instantaneous spatial position may be repositionable within the scope of the present invention, however they are not required to be.

Unless defined otherwise herein, all technical and scientific terms used herein have the same meaning as commonly understood by one of skill in the art to which the invention pertains.

Although any methods and materials similar to or equivalent to those described herein can be used in the practice or testing of the present invention, the preferred methods and materials are described herein. Systems and methods will now be described more fully hereinafter with reference to the accompanying drawings, in which some, but not all embodiments of the invention are shown. Indeed, the invention may be embodied in many different forms and should not be construed as limited to the embodiments set forth herein.

Likewise, many modifications and other embodiments of the system and methods described herein will come to mind to one of skill in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

In accordance with embodiments of the present invention now to be described, recent advances in quantum key distribution may be applied in conjunction with advances in drone technology to realize a reconfigurable network that enables free-space-channel quantum cryptography. Referring to FIG. 1A, a sender located at sender base 101 and a receiver disposed at receiver base 103 each load respective drones 111 and 113 with a sequence of random numbers. The terms "sender" and "receiver" refer herein to moieties of a network that function for transmitting and receiving information, respectively, and need not refer to sentient beings, even though the sender and receiver may be referred to herein collectively as "owners" of specified hardware. Equipment employed in the preparation of photons in particular states and in the measurement of the states of received photons shall be encompassed, within the terminology employed herein, as part of the "sender" and "receiver," respectively. Encoding of photons by the sender may be referred to herein as a "quantum key transmission protocol," whereas measurement of the states of received photons may be referred to herein as a "quantum key reception protocol."

The term "base" shall refer to a locus that is fixed with respect to a terrestrial frame of reference. Sender base 101 and receiver base 103 may also be referred to herein as "home stations," insofar as they pertain to respective drones 111 and 113.

In an alternate embodiment of the present invention, a real-time random number generator (not shown) may be located on each of drones 111 and 113. The real-time random number generator aboard respective drones 111 and 113 determines the state that is sent on each photon and the measurement basis used for each trial on the receiver. In the parlance of the present description, to "send a state on a photon" shall mean to prepare a photon in a specified, or at least known, quantum state.

Figure 1B:
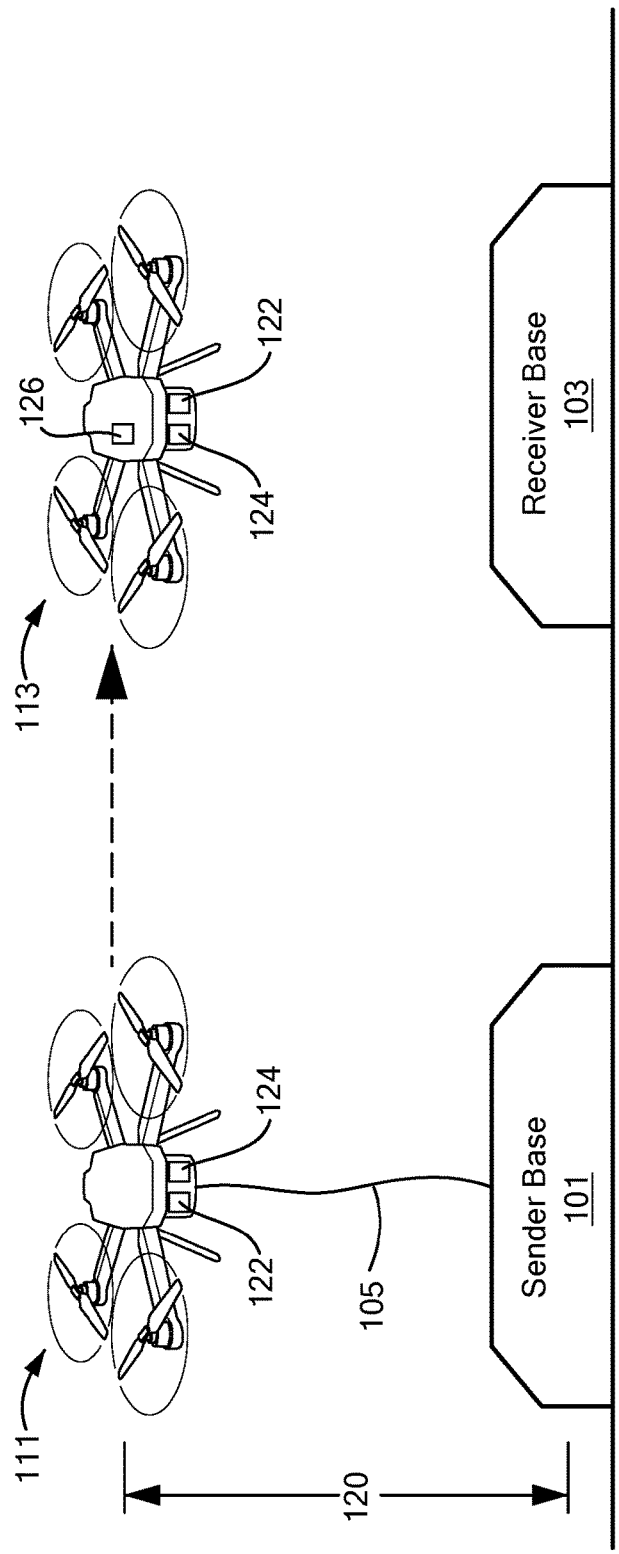
Figure 1C:
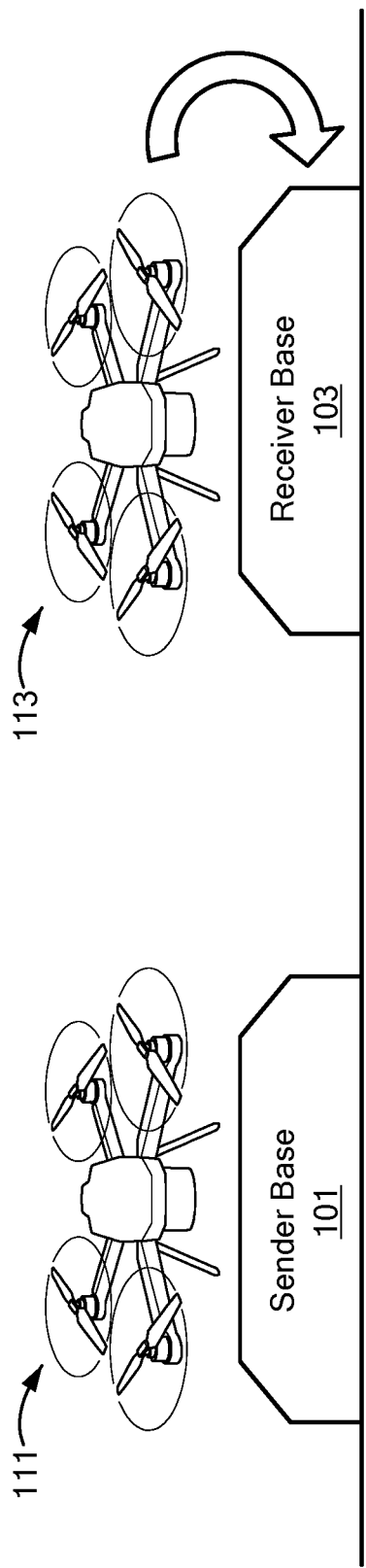

After the step depicted in FIG. 1A, drones 111 and 113 are then directed to ascend to a substantially common altitude 120, as shown in FIG. 1B. In an alternate embodiment of the present invention, either the sender or receiver may remain on the "ground", with only one drone elevated. After an acquisition protocol in which they "find" each other, the drones use quantum key distribution protocols to establish raw key material by exchanging single photons, entangled photons, or weak classical pulses. Within the scope of the present invention, the acquisition protocols may be currently known in the art, or later invented. The current invention is agnostic with respect to the acquisition protocols employed. Subsequently, as shown in FIG. 1C, drones 111 and 113 descend back to their respective owners, who can complete the necessary basis reconciliation, error correction and privacy amplification parts of the protocol, resulting in a secure secret key. The use of multiple drones enables networks to be established with a number of parties exceeding two, thereby enabling both multiparty protocols, as well as robust methods to circumvent device failure or channel disruption.

Embodiments in accordance with the current invention may advantageously solve difficulties surrounding prior art quantum cryptography that uses fixed location transmitters and receivers and, in some cases, dedicated underground fiber optical links, between transmitters and receivers. Where the use of fixed telescopes or dedicated fiber links is not practical, embodiments of the present invention may be applied advantageously in temporary or rapidly changing environments, such as during a natural disaster or on a military battlefield. Moreover, free-space communications may be limited by intervening structures, fog, or other environmental circumstances that limit visibility. The use of aerial vehicles may advantageously enable one to use the free-space channel at an altitude 120 potentially free of these environmental disturbances. Moreover, because the drones 111 and 113 can be readily relocated to different locations, the entire network is flexible in a way completely impossible with pre-laid optical fibers, or even optical telescopes, which would not be conveniently relocated. Because they are repositionable and reconfigurable, embodiments of the present invention are more flexible than the prior art in the face of environmental circumstances. It has the possibility of enabling substantially cheaper quantum cryptography, which could make it amenable to individual users, or in circumstances such as ship-to-ship communication or communication between soldiers, or other emergency personnel.

A typical aerial drone that is currently commercially available can provide lift for up to 2 kg of payload, and also up to 2 W of continuous power, with typical flight times before recharging of 15 minutes, although these limitations have no bearing on the scope of the present invention. Even the most limiting specifications are suitable, within a comfortable margin of error, for realizing an airborne quantum cryptography system. In some embodiments of the invention, one drone serves as a sender and another as a receiver, whereas, in other embodiments, each drone serves as both sender and receiver. In accordance with one exemplary embodiment, drone 111 may be charged electrically at its base station, and also loaded with a long string of random numbers, e.g., provided by a quantum random number generator. Alternatively, the random number generator may be located on the drone.

Drone 111 typically has instructions to autonomously run the photon transmission (in the case of the sending drone) and receiving (in the case of the receiver) quantum key distribution protocol. That is to say that, where transmission and reception are run autonomously, there is no external radio frequency, or other, control of the QKD protocol once a drone has left the base station. This precludes remote hacking of the drone by an adversary.

Referring now to FIG. 1B, one or both drones 111 and 113 are sent aloft to a mutually agreed-upon altitude 120, whereupon they initiate an "acquisition" protocol using one or more of a variety of finding mechanisms 122, which may include, without limitation, GPS or internal inertial guidance such as accelerometers and gyroscopes, to roughly come to a common altitude 120 and to point, respectively, toward each other. After that an optical beacon system 124 can be used to lock the two drones on to each other. One mode of operation of optical beacon system 124 entails the use of classical laser pulses sent by each drone, and photodetectors on the other drone, in combination with a feedback system to keep the drones pointing at each other during the quantum transmission. These beacons preferably operate at a wavelength different than that of the quantum signals, and are preferably used intermittently throughout the protocol to keep drones 111 and 113 aligned.

Next, referring still to FIG. 1B, the sending drone 111 will transmit photons (depending on the protocol, true single photons, an entangled pair, or attenuated coherent states) from a laser, to a receiving telescope 126, disposed aboard receiving drone 113. Within the scope of the present invention, 'decoy states' may also be employed, as proposed by Hwang, "Quantum key distribution with high loss: toward global secure communication," Phys. Rev. Lett., vol. 91, 057901 (2003) and described in detail in Wang, "Beating the PNS attack in practical quantum cryptography," Phys. Rev., vol. 94, 230503 (2005), both of which are incorporated herein by reference. The transmitted photons are preferably time synchronized, where synchronization may be realized using the beacon light itself.

Any QKD protocol, whether already established or to be established in the future, may be used within the scope of the present invention as claimed. For purposes of heuristic concreteness, the use of polarization states to encode the desired random number string is initially described, using a protocol that is resistant to possible sway of the drone, as described in greater detail below. For example, using the Bennett-Brassard-1984 (BB84) scheme (described in Bennett et al., "Quantum Cryptography: Public Key Distribution and Coin Tossing," Proc. IEEE Int. Conf. on Computers, Systems and Signal Processing (Bangalore), pp. 175-79 (1984), hereby incorporated by reference), photons are sent in one of four polarization states: horizontal (H), vertical (V), left circularly polarized, (L), or right circularly polarized (R). On the receiving side, they are randomly measured in either the horizontal-vertical or the circular polarization bases.

Figure 2:
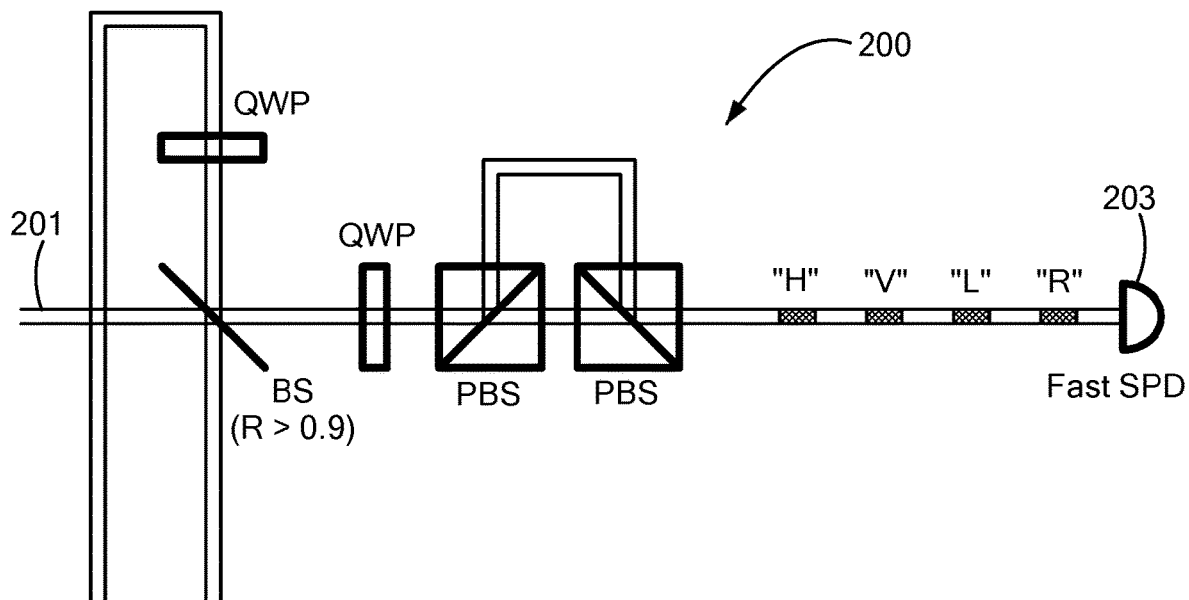
FIG. 2 depicts a method to distinguishably detect 4 polarization states with a single single-photon detector (SPD) in accordance with an embodiment of the present invention.

After exchanging the raw key material for a time dictated by protocol requirements or by the sustainable airtime of the drones, the drones 111 and 113 descend back to their respective home stations 101 and 103, where receiver data concerning which polarizations were measured for which photons is offloaded from drone 113. If the transmitted polarizations and receiving basis analyses are loaded onto the drones before they take off, there is no need to recover this information. In accordance with other embodiments of the present invention, transmission polarizations and measured polarization may be generated while the drone is in flight, using local random number generators. In that case, further assurances are preferred to ensure that no eavesdropper can control these while the drones are in the air. The measured polarization data typically consist of time tags of photon detection events on the detector(s) on the receiving drone. Although one can in principle use a separate single-photon counting detector for each polarization state analysis, is likely preferable to use a simple optical circuit to encode the polarization information into the arrival time of the photons. One example of an optical configuration, designated generally by numeral 200, for converting polarization state into a time lag is shown in FIG. 2. When a single photon injected at input 201 emerges and is detected by a single photon detector (SPD) 203 depends on whether the photon is in an H, V, L or R state, as those terms are defined above. "QWP" denotes a quarter-wave plate, and "PBS" denotes a polarizing beam splitter. The temporal encoding of polarization state obviates carrying multiple detectors and their associated power supplies and time-tagging electronics.

Once the drone data has been downloaded to the base stations 101 and 103, the usual quantum key distribution protocol continues. This includes "reconciliation" (in which sender and receiver identify the bases used for each photon, but not the actual polarizations sent or received), error detection/correction, and suitable privacy amplification to remove any residual information possibly known to an eavesdropper. The reconciliation, error correction and privacy amplification steps take place by classical communication between the parties using a standard public communication system, such as over the internet or over a wireless link. Standard techniques to account for the finite length of the string of random numbers is included as described, for example, by Bacco et al., *"Experimental quantum key distribution with finite-key security analysis for noisy channels"*, Nature Comm., vol. 4, 2363 (2013), which is incorporated herein by reference.

Embodiments of the presently claimed invention admit the use of any modality of encoding information, standard or otherwise, such as polarization, time-bin, spatial mode, etc. Although there are many benefits to using polarization, due to the simplicity of the analysis in multiple bases, one potential challenge arises from the relative motion of the sender and receiver, particularly in a drone-based network. Specifically, if the drones exhibit a relative "roll" with respect to each other, there will be a slight modification in the intended polarization bases, e.g., a photon sent with horizontal polarization may nevertheless be detected in a nominally "vertical" polarization detector, due to relative orientation of the receiver. Numerous methods have been reported for dealing with this effect, and any may be used within the scope of the present invention. One example is described by Zhang et al., "Reference-Frame-Independent Quantum-Key-Distribution Server with a Telecom Tether for an On-Chip Client", *Phys. Rev. Lett.*, vol. 112, 130501 (2014), which is incorporated herein by reference.

It is to be understood that embodiments of the present invention encompass all relative elevations of multiple drones. Thus, for specific examples, a first and a second drone may be at the same elevation relative to the surface of the earth, or at different elevations. More particularly, one of the drones may be at zero elevation, within the scope of the present invention.

In accordance with a modified, sway-resistant protocol, left- and right circular polarizations are used explicitly because of their robustness with respect to variations in the relative sender—receiver orientation, since a left-circularly polarized photon, for example, will always be measured as such, regardless of the relative orientation of the sender and receiver. These orientation-robust states (namely, states of circular polarization) are used primarily for data transmission, while the linear polarization basis (such as horizontal and vertical, or some other orthogonal basis) is primarily used to monitor the presence of an eavesdropper. In the absence of any eavesdropper, any relative sway (more precisely, "roll") of the transmitting and receiving drones will not affect data encoded in the circular polarization basis. An eavesdropper trying to measure the photons in that basis will necessarily introduce errors to photons encoded in the linear polarization basis. Detecting these errors allows one to quantify and set bounds on the amount of information that could be known by a potential eavesdropper, based on quantum mechanical calculations.

Relative orientations will introduce errors into the linear polarization basis, but any such errors may be conservatively assumed to be due to the intervention of a potential eavesdropper. Previously established theory enables one to set limits on how much information the eavesdropper could have based on these error rates; roughly speaking, for a measured bit error rate of x %, the eavesdropper can be assumed to know 4x % of the key. One must therefore perform extra privacy amplification accounting for this additional information potentially known by the eavesdropper. The net result is that one can usually sustain bit error rates only as high as 11%, before it becomes impossible to securely transmit any key material, after error correction and privacy amplification, as discussed by Shor et al., *"Simple Proof of Security of the BB84 Quantum Key Distribution Protocol,"* Phys. Rev. Lett., vol. 85, pp. 441-44, (2000), which is incorporated herein by reference. An error of 11% corresponds to a maximum allowable sway angle (assuming no active correction is done, though this is another possibility) of 19°.

One alternative to polarization encoding for QKD is the use of time bins. For example, in one protocol, sending a raw 0 or 1 corresponds to sending the photon in an early or a late time bin, respectively. As long as the sender and receiver can maintain synchronization with each other, which may be maintained, e.g., using the optical alignment beacon, the receiver will correctly identify the raw key bits for any photons he detects (we assume the spacing between the early and late time bins to be sufficiently greater than the receiver's detector timing jitter). In order to prevent a potential eavesdropper from making exactly the same measurement, and therefore being undetectable to the legitimate QKD users, a randomly chosen fraction of the data is also sent in a quantum superposition of the early and late time bins; similarly, a randomly chosen fraction of the data is analyzed using an unbalanced interferometer, which can therefore measure the phase coherence between the photon amplitudes in the early and late time bins prepared by the sender. Any eavesdropper who has made a measurement of the time bins will introduce errors into this time-bin-superposition basis measurement. Using time bins has the advantage that there is no need to worry about the relative orientation of the sender and receiver. Moreover, the problem of preparing otherwise indistinguishable photons with different polarizations is replaced with the somewhat simpler problem of preparing photons in particular time bins (which can easily be realized using a single pulse laser, optical delays, and fast modulators).

On the receiving side, there are various ways to implement the multi-basis options. An active switch (e.g., a fast modulator) may be used to actively make a multi-basis decision. Alternatively, a simple beam splitter may be used, along with two entirely separate measurement systems, one of which measures time bins, and the other which measures the required superposition. In yet another embodiment of the invention, a hybrid system may be employed that uses the other possibilities in the unbalanced analysis interferometer to extract the time-bin locations most of the time.

A drone-based QKD system preferably employs a substantial amount of optical filtering, in order to accept the quantum signal while rejecting background light. This can be achieved using precise timing (sub-nanosecond resolution is standard) and spectral filtering (e.g., using interference filters, diffraction gratings, or atomic-transition-based filters). Finally, the directionality of the sending and receiving optics (preferably miniature drone-capable telescopes) will naturally help to reduce background. Distinct design considerations will dictate whether or not it is optimally advantageous to collect into single-mode optical fiber, few-mode optical fiber, multi-mode optical fiber, or using free-space coupling to the single-photon detector, according to system tradeoffs that are evident to a person of ordinary skill in the art.

The optimal wavelength for a drone-based QKD system will depend on the particulars of the application, e.g., the presence of aerosols (there could be many in a naval application), the time of day during which the system is to operate, and payloads considerations of the transmitting and receiving drones. The present invention is agnostic with respect to the aforesaid design considerations.

Discussion above has been focused, for heuristic convenience, on a system where both sender and receiver are carried on drones. A system, moreover, in which only one of the sender and receiver is disposed aboard a drone, while the other is on a fixed terrestrial, or ship, station, is also within the scope of the present invention. In certain embodiments of the invention, source 130 (shown in FIG. 1A) could be on the ground, with the optical signals sent up to the drone, either via a fiber-optic tether 105 (shown in FIG. 1B), or via free-space optics. In the former case, the sending drone includes optics (not shown) to transmit the light from fiber-optic tether 105 into free-space to the receiver (typically on the other drone 103). In the latter (free-space optics) case, the sender drone would essentially be acting as a mirror to redirect the photons from the ground station to the other drone 113. Similarly, the receiver 'drone' need not have the analysis apparatus or detectors 'on-board', but may, instead, relay received photons back to the ground, again using either a fiber-optic link or free-space.

Figure 3:
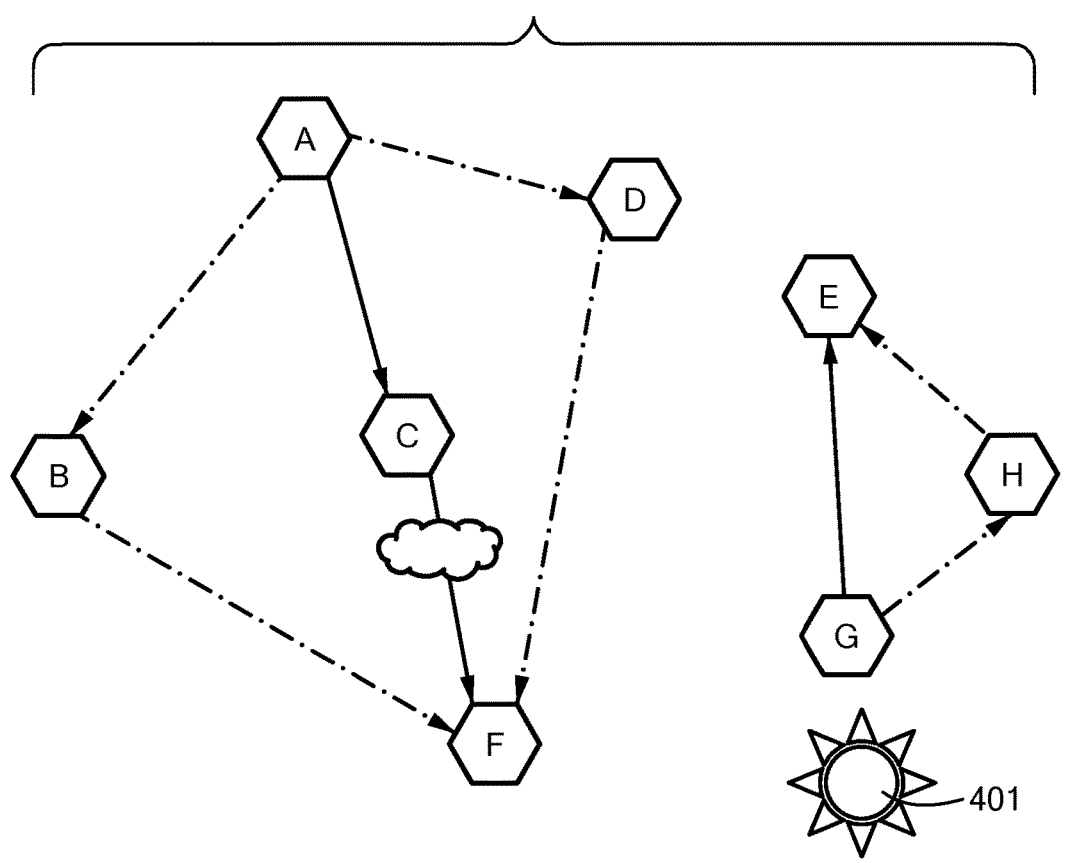
FIG. 3 schematically depicts a QKD network, showing the use of alternate paths to accommodate for incapacitated nodes, channels, or the presence of prohibitive background.

Referring now to FIG. 3, the use of more than two drones A, B, C, D, E, F, G and H enables implementation of both established and novel network options. Insofar as drones A, B, C, D, E, F, G and H constitute network nodes, as the term is defined above, those drones may also be referred to herein as "drone-nodes" or "nodes." For example, if Drone—node C were to become disabled, or the channel between nodes C and F were to be blocked, a quantum key could still redistributed from start Drone A to final Drone F, instead using intermediate Drones B or D. Another potential circumstance is blinding by the Sun (or some other bright source). In particular, the receiver at node E might become unable to correctly identify photons from a transmitter at node G, because of the presence of a large background due to the Sun 401 being along the line that connects them. Instead, a link can be established by a third intermediate drone station, e.g., H or D. Alternatively, the fact that the drones can operate at disparate altitudes may advantageously provide for angling the receiving telescope 126 (shown in FIG. 1B) above or below the position of the Sun or other bright background source.

Though it is natural to consider the drones as part of a drone-only network, this certainly needn't be the case. In particular, one can consider drones as forming only a subset of nodes in a network which includes fiber links, and/or free space optical links (e.g., via telescopes). The inclusion of these other node modalities is not excluded by this patent, and will be apparent to persons skilled in the art.

The embodiments of the invention described above are intended to be merely exemplary; numerous variations and modifications will be apparent to those skilled in the art. All such variations and modifications are intended to be within the scope of the present invention as defined in any appended claims.

We claim:

1. A system for transmitting information as a quantum signal comprising:
   a first node characterized by a first instantaneous spatial position;
   a second node characterized by a second instantaneous spatial position, the second instantaneous spatial position being repositionable within a frame of reference associated with the first node;
   a first drone, in a hovering relationship with the first node, adapted to run a quantum communication protocol based on quantum communication from the first node, for transmitting information as a quantum signal between the first node and the second node, and to transmit and/or receive a quantum transmission to or from the second node, directly or indirectly via one or more other drones, using the quantum communication protocol.

2. A system in accordance with claim 1, further comprising a second drone adapted to hover aloft in a relative orientation to the first drone so as to maintain alignment of a beam between the first and second drones and wherein the second drone is further adapted to run a quantum key reception protocol, based on secure communication with the second node.

3. A system in accordance with claim 2, further comprising a locking beacon for maintaining the first and second drone in the relative orientation for quantum state transmission and reception.

4. A system in accordance with claim 3, wherein the second drone includes a preprogrammed measurement system for quantum state distribution.

5. A system in accordance with claim 1, wherein the first drone includes a preprogramed source for quantum state distribution.

6. A system in accordance with claim 1, wherein the first drone includes a random number generator.

7. A system in accordance with claim 1, further comprising a secure link for transmitting light from a secure source at the first node to the first drone.

8. A system in accordance with claim 1, wherein a random number generator is disposed at the first node.

9. A system in accordance with claim 2, wherein the first and second drones are adapted to initiate an acquisition protocol to establish quantum state transmission from the first to the second drone.

10. A system in accordance with claim 9, wherein the acquisition protocol employs a finding mechanism chosen from a set of modalities including GPS, inertial guidance, and optical beacons operating at a different wavelength and/or a different temporal mode or a different spatial mode from a wavelength, temporal mode and spatial mode characterizing the quantum transmission.

11. A system in accordance with claim 1, wherein the quantum communication protocol comprises a quantum key protocol, and the first drone is adapted to run the quantum key protocol based on secure quantum communication from the first node.

12. A method for transmitting information as a quantum signal between a first node and a second node, the method comprising:
- sending a first drone aloft in communication with the first node;
- receiving at the first drone a secure communication from the first node;
- sending a second drone aloft;
- maintaining a relative orientation between the first drone and the second drone so as to maintain alignment of a beam between the first drone and the second drone;
- initiating an acquisition protocol to establish quantum communications between the first drone and the second drone; and
- transmitting information as a quantum signal from the first node to the second node via at least the first drone.

13. A method in accordance with claim 12, wherein the first drone is an optical relay of the quantum signal from the first node to the second drone.

14. A method in accordance with claim 12, wherein at least the second drone acts as an optical relay of the quantum signal from the first drone to the second node.

15. A method in accordance with claim 14, further comprising performing a QKD measurement aboard the second drone of the quantum signal received by the second drone.

16. A method in accordance with claim 12, wherein transmitting information comprises transmitting encrypted information from the first drone to the second drone.

17. A method in accordance with claim 12, further comprising transmitting random bits securely from the first node to the first drone.

18. A method in accordance with claim 17, wherein random bits are transmitted securely from the first node to the first drone via an optical fiber tether.

19. A method in accordance with claim 17, wherein random bits are transmitted securely from the first node to the first drone via free-space optics.

20. A method in accordance with claim 17, wherein random bits are generated within the first drone.

21. A system for transmitting information comprising:
- a first node characterized by a first instantaneous spatial position;
- a second node characterized by a second instantaneous spatial position, the second instantaneous spatial position being repositionable within a frame of reference associated with the first node;
- a first drone adapted to receive while aloft a secure communication from the first node;
- a second drone adapted to hover aloft in a relative orientation to the first drone so as to maintain alignment of a beam between the first and second drones and wherein the second drone is further adapted to initiate an acquisition protocol to establish quantum communications between the first drone and the second drone; and
- wherein the first drone is adapted to transmit information from the first node as a quantum signal to the second node via at least the second drone.

* * * * *